Figure 1:
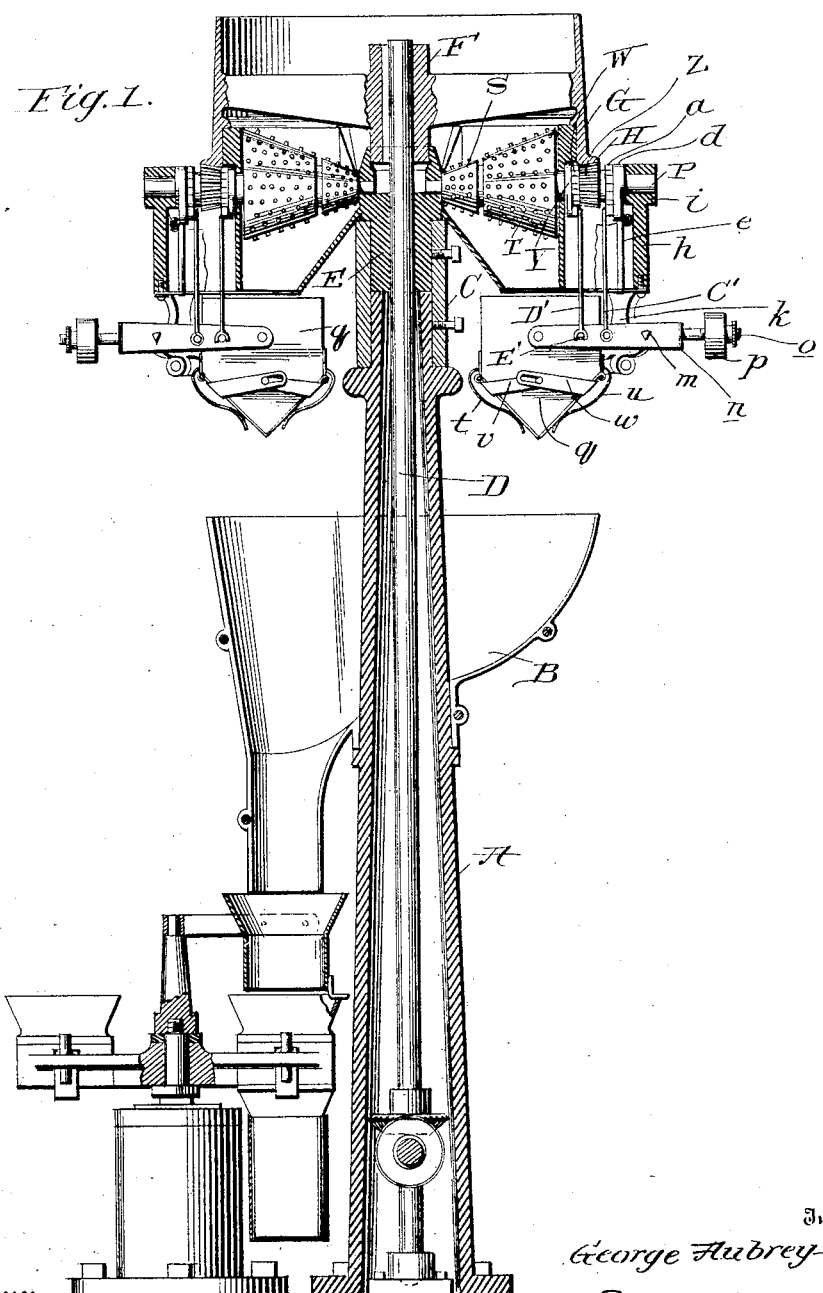

No. 860,392. PATENTED JULY 16, 1907.
G. A. LEE.
AUTOMATIC WEIGHING MECHANISM.
APPLICATION FILED MAY 1, 1906.

4 SHEETS—SHEET 1.

Witnesses
Inventor,
George Aubrey Lee,
By Dodge and Sons,
Attorneys

No. 860,392. PATENTED JULY 16, 1907.
G. A. LEE.
AUTOMATIC WEIGHING MECHANISM.
APPLICATION FILED MAY 1, 1906.
4 SHEETS—SHEET 2.
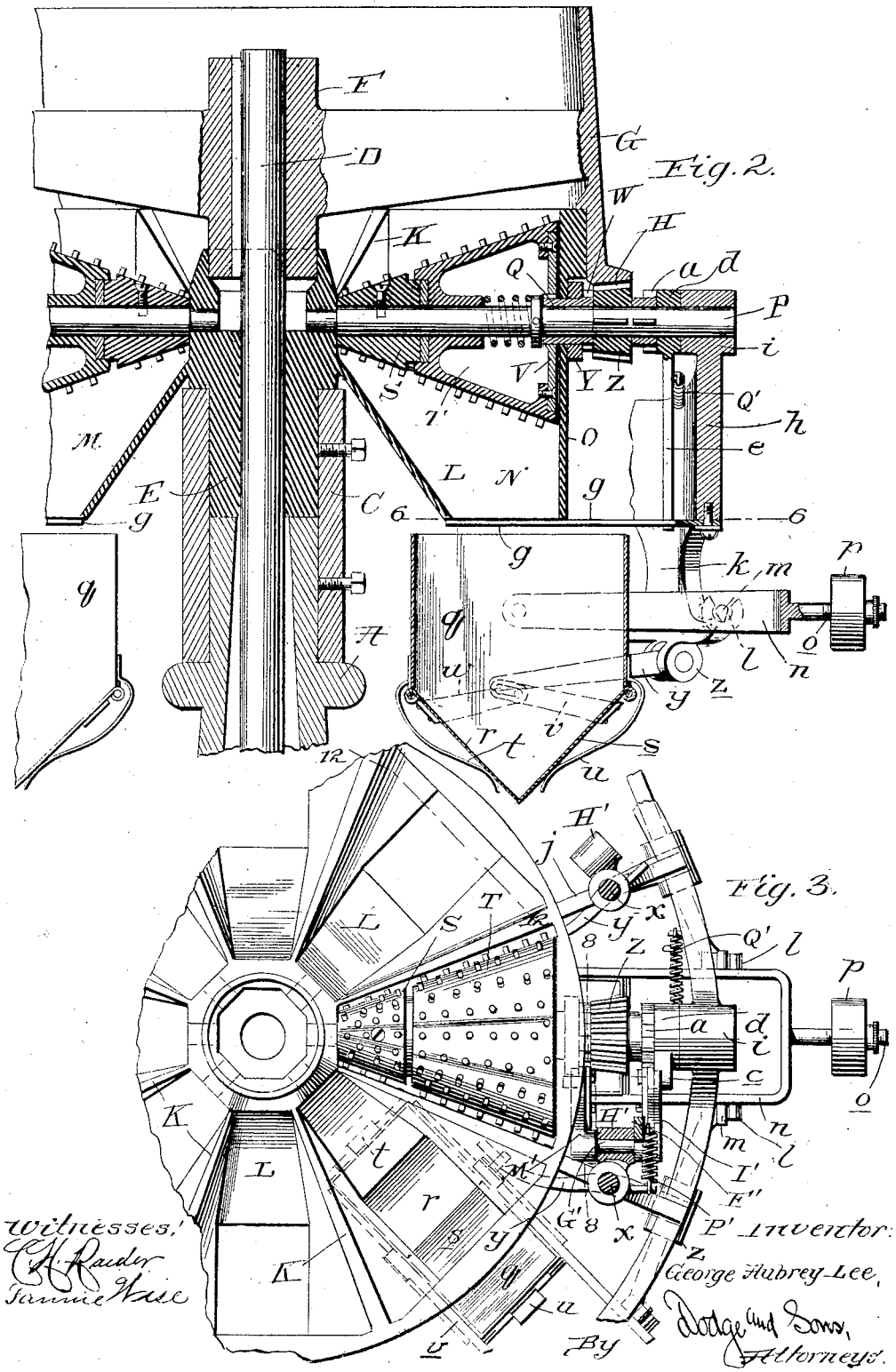

No. 860,392. PATENTED JULY 16, 1907.
G. A. LEE.
AUTOMATIC WEIGHING MECHANISM.
APPLICATION FILED MAY 1, 1906.
4 SHEETS—SHEET 3.
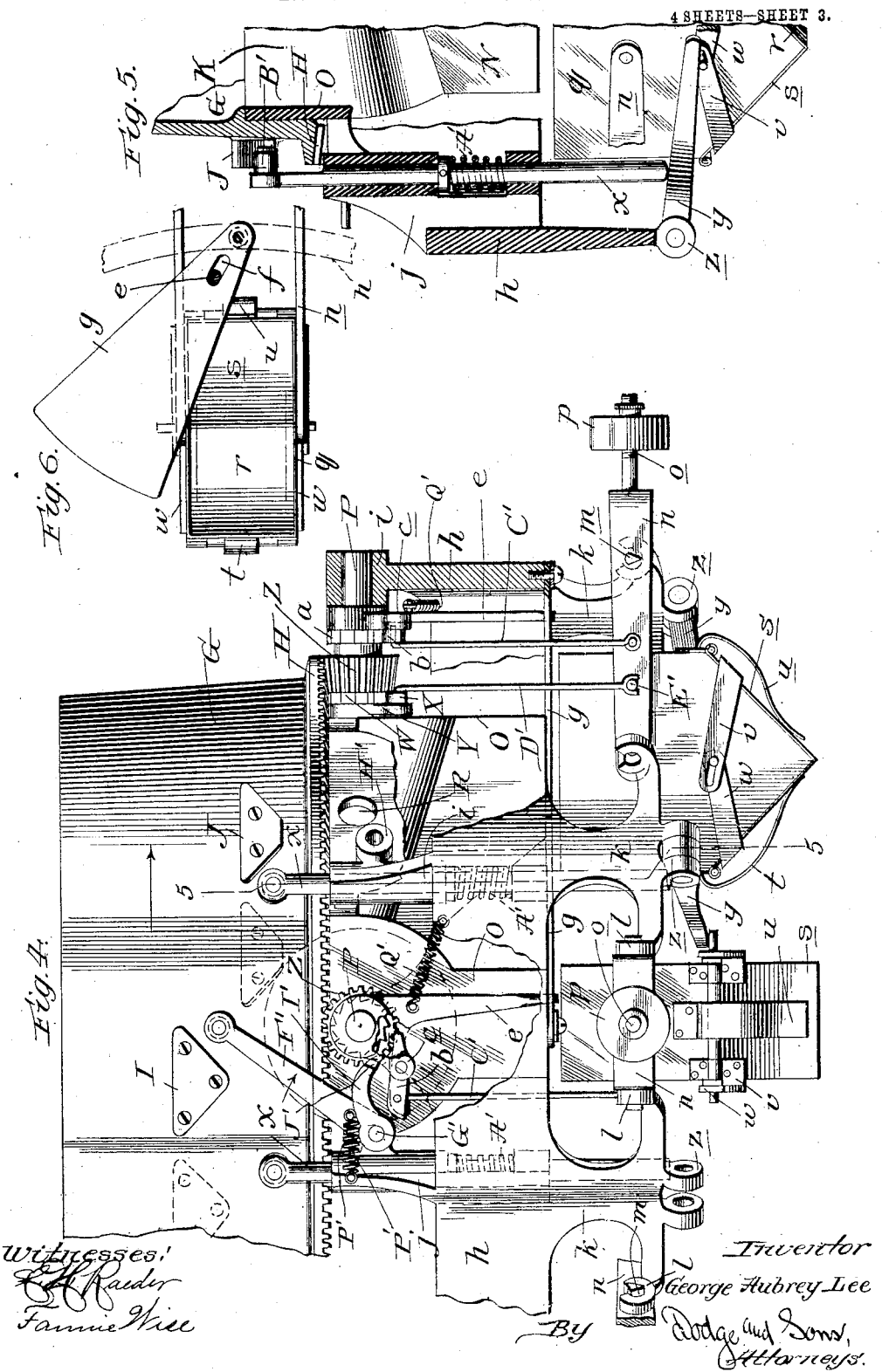
Witnesses:
Inventor
George Aubrey Lee
By Dodge and Sons,
Attorneys.

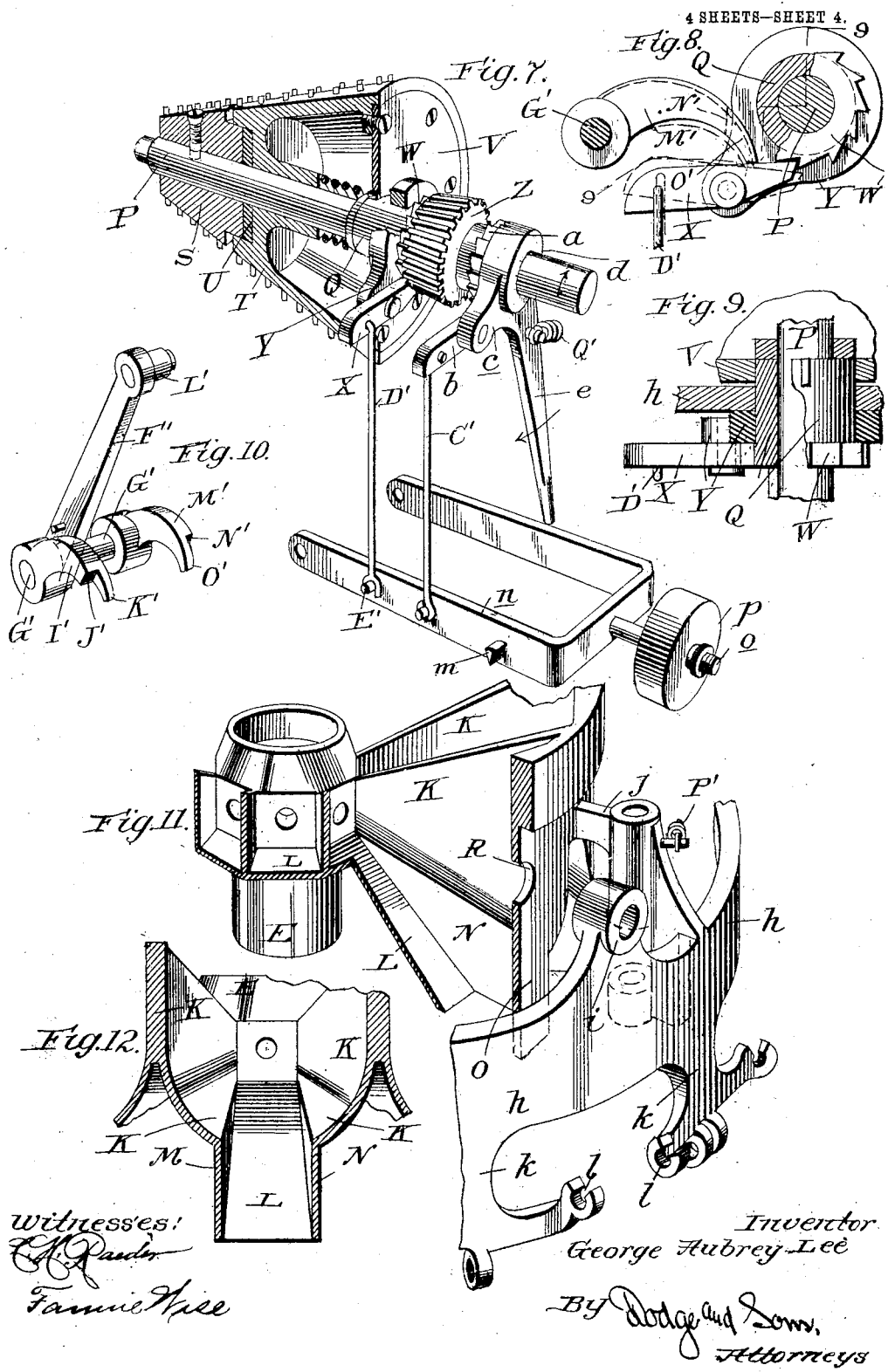

UNITED STATES PATENT OFFICE.

GEORGE AUBREY LEE, OF YONKERS, NEW YORK, ASSIGNOR TO AUTOMATIC PACKING & LABELING COMPANY, OF DURHAM, NORTH CAROLINA, A CORPORATION OF NORTH CAROLINA.

AUTOMATIC WEIGHING MECHANISM.

No. 860,392.  Specification of Letters Patent.  Patented July 16, 1907.

Application filed May 1, 1906. Serial No. 314,715.

*To all whom it may concern:*

Be it known that I, GEORGE AUBREY LEE, a citizen of the United States, residing at Yonkers, in the county of Westchester and State of New York, have invented certain new and useful Improvements in Automatic Weighing Mechanism, of which the following is a specification.

My present invention pertains to improvements in automatic weighing mechanism, the apparatus being particularly adapted for use in conjunction with packaging machines.

The invention will best be understood upon reference to the annexed drawings, wherein:

Figure 1 is a vertical sectional view of the weighing mechanism and a portion of the packaging mechanism; Fig. 2 a vertical sectional view, on an enlarged scale, of a portion of the weighing mechanism; Fig. 3 a top plan view thereof; Fig. 4 a side elevation of a portion of the weighing mechanism, the parts being broken away to more clearly illustrate the construction; Fig. 5 a vertical sectional view, taken on the line 5—5 of Fig. 4; Fig. 6 a horizontal sectional view, on the line 6—6 of Fig. 2, illustrating the gate which is employed to temporarily close the feed hoppers or chambers; Fig. 7 a perspective view of a portion of the operative mechanism, the main feed roll and the dribble roll being shown in section; Fig. 8 a vertical sectional view, on the line 8—8 of Fig. 3, showing the pawl-carrier, pawl and coacting ratchet and the releasing device therefor, which control the movements of the main or large feed roll; Fig. 9 a sectional view taken on the line 9—9 of Fig. 8; Fig. 10 a perspective view of the actuating lever employed to release the pawls from the ratchets; Fig. 11 a sectional perspective view of the frame or casting in which the feed chambers are formed, and which also serves as a support for the scale-pans and the attendant parts; and Fig. 12 a vertical sectional view taken through one of the feed hoppers or chambers, the line of section being indicated by the line 12—12 in Fig. 3.

The object of the invention is to provide a simple and efficient mechanism which will automatically deliver to a bag or other container a definite quantity of material to be packaged.

The apparatus may be said to consist of a series of scales or scale-pans into which a stated amount of material is fed, the pans being automatically discharged in rotation. The material passes from the pans into a receptacle common to all the pans, whence it is delivered to a bag or other closure.

The mechanism also includes a main feed roll, a constantly-driven dribble roll, mechanism whereby rotation of the main roll will be stopped when approximately the desired weight of material is fed into a scale-pan, and means whereby further discharge of the material from the feed hopper or chamber by the dribble roll will be cut off when the exact amount has passed into the scale.

In the drawings, A denotes a stand or column, preferably supported upon the bed of the packaging machine, said stand or column carrying a hopper or receptacle B which, as above noted, is coextensive with the various scales or scale-pans which stand above the same. A sleeve or collar C is secured to the upper portion of the column A and a shaft D is mounted within the column and passes through and has its bearing in the hub E of the casting in which the feed chambers or hoppers are formed, and which will be hereinafter described in detail. Said hub is fast to the collar C and is, therefore, held against rotation.

To the upper end of shaft D is secured the hub F of a wheel-like actuating member, the lower edge or rim G of which is provided with gear-teeth forming in effect a toothed wheel H. Said rim is also provided with two cams I and J, the former serving to release the pawls which have brought the main feed roll to a standstill and closed the gate or door beneath the feed hopper when the requisite amount of material has passed therethrough to the scale-pan below. The second cam is designed to coact with a rod which opens the scale-pans and discharges the contents thereof into the hopper or receptacle B.

Spaced about the hub E and defined by the vertical walls K, the inclined bottom wall L, the walls M, N, and the vertically-disposed annular or ring-shaped outer wall O, is a series of hoppers or feed chambers in which the feed rolls are mounted. The formation of the chambers will be best understood upon reference to Figs. 11 and 12, wherein it will be noted that the lower edges of the walls K are curved inwardly and connect with the vertically-disposed walls M and N. The curvature of the lower portions of the walls K is the same as that of the feed rolls which work adjacent thereto.

A shaft P is mounted in each of the feed chambers, the shaft at its inner end being seated in a bearing formed in the hub E. Said shaft carries a collar or sleeve Q loosely mounted thereon, the collar extending through an opening R formed in the vertical wall O. Upon said shaft is mounted a pair of frusto-conical feed rolls S and T. Roll S is the dribble roll and is made comparatively small, being secured to the inner end of the shaft by a set-screw, or in any other suitable manner. The outer end of the roll is reduced and passes into a socket or recess formed in the adjacent end of the roll T, which is loosely mounted upon the shaft P. A friction washer U is interposed between the adjacent faces of said rolls. The outer end of the roll T is provided with a head or closure V which is splined or otherwise rigidly affixed to the sleeve Q. Said sleeve, as will be best seen upon reference to Figs. 8 and 9, is provided with a ratchet-wheel W, with which coacts a locking pawl X, fulcrumed upon the lower end of a pawl-carrier Y, loosely mounted upon and encircling the sleeve Q.

A gear Z is secured to shaft P adjacent to the ratchet-wheel W, said gear meshing with the gear H of the actuating member, and as said actuating member is constantly rotated the shaft P will likewise have a constant motion imparted to it.

A second ratchet-wheel $a$ is secured upon shaft P, and a pawl $b$ mounted upon the short arm $c$ of an elbow-lever $d$, fulcrumed upon the shaft P, is adapted to coact with said ratchet-wheel and to lock the elbow-lever to the shaft and cause it to partake of the rotation of said shaft for a stated period. The lower or long end $e$ of said lever projects into a slot or opening $f$ in a swinging gate $g$, pivoted to the under face of the upper ring-shaped or annular member $h$ of the hopper casing.

The outer end of the shaft P is journaled in a bearing $i$ formed upon the upper edge of the ring-shaped member $h$. Said member $h$ is secured to the member O by interposed webs $j$.

Extending downwardly from the ring-shaped member $h$ is a series of arms $k$, the laterally projecting ends of the arms being provided with bearings $l$ which form the supports for the knife-edge bearings $m$ of the U-shaped scale-beam $n$. One of said beams is shown in detail in Fig. 7 and is provided at its outer end with a threaded rod $o$ upon which is adjustably mounted a weight $p$. The yoke or beam has pivotally connected to it a scale-pan $q$, provided with pivoted bottom plates $r$, $s$, normally held closed by springs $t$ and $u$. The bottom plates are connected to each other by arms $v$ and $w$, one arm carrying a pin which works in a slot formed in the opposite arm.

A rod $x$, mounted in vertically-disposed bearings formed in the web $j$ bears upon a lever $y$ fulcrumed between ears $z$, formed at the lower end of the arm $k$. The inner end of said lever projects over the pin carried by the arm $w$, see Fig. 5. Normally the rod $x$ is maintained in its elevated position by a spring A′, but is depressed by the cam J, which acts upon a roller B′ carried by the upper end of rod $x$. This cam comes into action and depresses the rod after the proper amount of material has been fed into the scale-pan.

A rod C′, see Fig. 7, is pivotally connected at its lower end to the scale-beam or a stud extending outwardly therefrom, the upper end of said rod being pivotally connected to the outer end of the pawl $b$. A second rod D′ is connected to the outer end of the pawl X, the lower end of the rod being forked and normally resting upon a pin or stud E′ extending outward from the beam. It is to be noted that the rod D′ stands at a greater distance from the knife-edge bearing or fulcrum $m$ of the beam than does the connection of the rod C′ to the beam. The weight of the rod D′ is depended upon to draw the pawl X down when the beam is tilted so that said pawl may be thrown into operative relation with the wheel W and thereby arrest the rotation of the sleeve Q, and consequently stop the rotation of the large feed wheel T. The pawl $b$ will not, however, come into action at this time, so that the dribble roll S may continue to feed material slowly into the scale-pan. Upon a further downward movement of the pan, by the addition of material fed thereto by the dribble roll S, the pawl $b$ will come into action, locking the elbow-lever $d$ to the shaft P and thereby causing said lever to swing in the direction of the arrow shown in Fig. 7, and as a consequence move the gate $g$ beneath the lower end of the feed hopper or chamber, thereby cutting off the further discharge of material from said feed chamber to the scale-pan. The parts are so timed that the gate cuts off this supply at the exact moment required, so that each charge of material which passes into the scale-pan and thence to the main discharge hopper B will be of equal weight.

As will be readily appreciated, as soon as the cam J passes into contact with the roller B′ on the rod $x$, said rod will be depressed and the plates or doors $r$, $s$, opened against the action of the springs, and the weighed material discharged from the scale-pan.

In order to positively withdraw the pawls and to force the pawl-carrier Y and the elbow-lever $d$ back to their normal positions, I employ an actuating device of the form best shown in Fig. 10. It comprises an arm or lever F′ secured to a shaft G′ fulcrumed upon an ear or bearing H′ extending outwardly from the web $j$. Formed as an integral portion of lever F′ is a finger I′, provided with a shoulder J′, the reduced end of a finger K′ serving to release the pawl $b$ when said finger is thrown downwardly by the action of the cam I upon a roll L′ secured to the upper end of the arm F′. The shoulder J′ contacts with the arm $c$ of the elbow-lever $d$, and consequently throws the same to the right, or in a direction opposite to the arrow in Fig. 7, thereby opening the gate which was momentarily closed beneath the hopper or feed chamber. A second finger, M′, provided with a shoulder N′ and a reduced end O′, is secured upon the opposite end of the shaft G′, said shoulder N′ and reduced portion O′ coacting, respectively, with the pawl-carrier Y and pawl X. A spring P′ (Fig. 4) is secured to the arm F′ and to a fixed portion of the machine, said spring serving to draw the arm rearwardly and to thereby raise the pawl-releasing fingers. The cam I is designed to come into action immediately the material has been discharged from the scale-pan and to again open the gate $g$, so that the material may be again passed into the scale-pan. To assist in the retraction of the gate a spring Q′ is secured to the arm $e$ of the elbow-lever and to the annular or ring-shaped member $h$.

The various parts are duplicated in each of the feed hoppers or chambers, there being eight of such hoppers in the construction herein shown.

It will be understood, of course, that but a single pair of operating cams I and J is carried by the actuating member G, and that they act successively to close the various doors and discharge the scale-pans throughout the series.

The material from one of the pans will pass out of the main hopper or receptacle B before the next pan is discharged, the parts being so timed that but one weighed charge can pass into the hopper at a time.

Having thus described my invention, what I claim is:

1. In combination with a hopper or chamber; a constantly-driven dribble roll; a larger feed roll; yielding driving connections between said dribble roll and the larger feed roll; a scale-pan located beneath the hopper; and connections between said hopper and the larger feed roll for arresting the rotation of said roll when the scale-pan has received its proximate charge.

2. In combination with a hopper or chamber; a constantly-driven dribble roll mounted therein; a larger feed roll also mounted in said chamber; frictional driving connections between said rolls; a scale-pan located beneath said hopper; a gate for closing the lower end of the hopper; and connections intermediate said scale-pan and friction-driven roll, and between the pan and the gate, whereby when the pan has received its proximate charge the larger feed roll will be brought to a standstill and upon further and full descent of the pan the gate will be closed.

3. In combination with a hopper or chamber; a shaft mounted therein; a dribble roll secured to the shaft; a second roll loosely mounted upon the shaft; frictional driving connections intermediate said rolls; a scale-pan located beneath the hopper; a pivoted gate arranged to close the lower end of the hopper; connections intermediate the scale-pan and the friction-driven roll for arresting the rotation of said roll when the pan has received its proximate charge; and connections intermediate said gate and the pan for swinging said gate to its closed position when the pan has received its full charge.

4. In combination with a hopper or chamber; a shaft mounted therein; a dribble roll secured to the shaft and rotating therewith; a second roll loosely mounted upon the shaft; frictional driving connections between said rolls; a gate mounted beneath the hopper, said gate standing normally in an open position; a scale-pan; a locking device for preventing the rotation of the second roll, said device being normally held out of operation when the scale-pan is elevated; an actuating device for closing and opening the gate, said device being controlled by the descent of the pan; means for discharging the material from the pan; and means for releasing the locking device and the gate-actuating device, said means coming into operation after the pan has been discharged.

5. In combination with a feed hopper or chamber; a shaft mounted therein; a dribble roll secured to and rotatable with the shaft; a larger feed roll loosely mounted on the shaft; frictional driving connections between said rolls; a ratchet secured to and rotatable with said larger feed roll; a pawl-carrier; a pawl pivoted upon said carrier and coöperating with the ratchet; a second ratchet secured upon the shaft; an elbow-lever loosely fulcrumed upon the shaft; a pawl fulcrumed upon said elbow-lever and normally standing in line with the ratchet secured upon the shaft; a gate pivotally mounted beneath the hopper; a scale-beam also fulcrumed beneath the hopper; means interposed between said beam and the first-mentioned pawl for normally holding the same out of action so long as the beam remains in its elevated position; connections between said beam and the second pawl for throwing the pawl into engagement with its ratchet when the beam approaches the limit of its downward movement; and means for releasing said pawls and returning the parts to their normal positions when the contents of the pan carried by the beam has been discharged.

6. In combination with a feed hopper or chamber; a shaft mounted therein; a dribble roll secured to the shaft and rotatable therewith; a feed roll loosely mounted upon the shaft; frictional driving connections between said rolls; a sleeve secured to the feed roll and encircling the shaft; a ratchet carried by the sleeve; a pawl-carrier swiveled upon said sleeve; a pawl pivotally mounted upon said pawl-carrier and in line with its ratchet; a second ratchet secured to the shaft; an elbow-lever loosely mounted upon the shaft; a pawl fulcrumed upon the short arm of said lever; a gate pivoted beneath the hopper, said gate being provided with a slot into which the long arm of the elbow-lever extends; a scale-beam fulcrumed at a point below the hopper; a rod pivoted to the first pawl and normally held in an elevated position by the scale-beam so long as the beam remains in its elevated position; a rod pivotally secured to the beam at one end and at its opposite end to the second pawl; means for discharging material from the pan carried by the beam; and means for releasing the pawls and throwing the pawl-carrier and the elbow-lever back to their normal positions.

7. In a weighing mechanism, the combination of a frame or casting provided with a series of feed hoppers or chambers; a scale-pan mounted beneath each of said hoppers; feed rolls mounted in each of said hoppers; an actuating device common to all of said feed rolls; a gate pivoted beneath each of said hoppers; connections between said scale-pans and gates, whereby the gates will be closed when the pans near their limit of downward movement; connections controlled by the descent of the pans for arresting the operation of the feed rolls; devices for discharging the pans; devices for opening the gates and restoring the rolls to their operative positions; and means carried by the actuating member for operating the discharge devices and releasing the devices for closing the gates and arresting the feed rolls.

8. In a weighing machine, the combination of a frame or casting provided with a plurality of feed hoppers or chambers; a shaft mounted in each of said hoppers; a gear carried by each of said shafts; an actuating member mounted above said gears and meshing therewith; a fixed feed roll mounted upon each shaft; a frictionally-driven feed roll also mounted on each of said shafts; a scale-pan located beneath each of said hoppers; a gate for each hopper; a rod serving to open each of said pans; connections intermediate the pans and frictionally-driven feed rolls for arresting the motion of said rolls; connections intermediate said pans and the gates for opening and closing the same; positioning devices for the connections aforesaid; and cams carried by the actuating member, one of said cams serving to operate the rods while the second cam operates the positioning devices.

9. In combination with a receptacle; a series of hoppers located above the same; a scale-pan situated beneath each hopper; a feeding mechanism located in each hopper; and means common to all the feeding mechanisms and the scale-pans for actuating the feeding mechanisms and successively discharging the scale-pans into the receptacle.

10. In combination with a central supporting member; a frame or casting sustained thereby, said frame being provided with a series of radially-disposed, outwardly-flaring hoppers; a conical feeding roll located in each hopper; a scale-pan situated beneath each hopper; and means common to all the feeding rolls and the scale-pans for actuating the feeding rolls and successively discharging the scale-pans.

In testimony whereof I have signed my name to this specification in the presence of two subscribing witnesses.

GEORGE AUBREY LEE.

Witnesses:
JAMES S. FITCH,
HORACE A. DODGE.